US006636255B1

(12) United States Patent
Kobayashi et al.

(10) Patent No.: US 6,636,255 B1
(45) Date of Patent: Oct. 21, 2003

(54) THREE-DIMENSIONAL IMAGE SCANNER AND HEAT-INSULATING DEVICE FOR OPTICAL APPARATUS

(75) Inventors: Fumio Kobayashi, Omiya (JP); Tetsuo Udagawa, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/236,481

(22) Filed: Jan. 25, 1999

(30) Foreign Application Priority Data

| Jan. 29, 1998 | (JP) | 10-032214 |
| Jan. 29, 1998 | (JP) | 10-032215 |
| Jan. 29, 1998 | (JP) | 10-032216 |
| Mar. 26, 1998 | (JP) | 10-098376 |

(51) Int. Cl.$^7$ .......................... H04N 3/02; H04N 5/253; H04N 9/10; H04N 9/47; G01B 11/24
(52) U.S. Cl. .......................... 348/98; 356/605; 356/618
(58) Field of Search .................. 348/40, 59, 96–97, 348/98, 158; 606/5, 11; 356/456–457, 511, 364, 121–122, 601, 605, 618; 250/580, 334

(56) References Cited

U.S. PATENT DOCUMENTS

| 4,564,295 A | * | 1/1986 | Halioua ........................ 356/605 |
| 5,636,025 A | * | 6/1997 | Bieman et al. ............... 356/619 |
| 5,835,218 A | * | 11/1998 | Harding ........................ 356/521 |
| 5,847,832 A | * | 12/1998 | Liskow et al. ............... 356/613 |
| 6,291,817 B1 | * | 9/2001 | Kobayashi et al. ...... 250/237 G |
| 2002/0047893 A1 | * | 4/2002 | Kremen ........................ 348/40 |

OTHER PUBLICATIONS

Lu et al, "Intensity modulated moire and its intensity–phase analysi", Fourteenth International Conference on Pattern Recognition, IEEE, vol. 2, pp. 1791–1793, Aug. 1998.*

Leonardi et al, "A system for measurement and visualisation of human back shape for estimation of 3D deformities", Proceedings of the IEEE Engineering in Medicine and Biology Society Region 8 International Conference, pp. 95–97, Sept. 1997.*

* cited by examiner

Primary Examiner—Vu Le
(74) Attorney, Agent, or Firm—Snider & Associates; Ronald R. Snider

(57) ABSTRACT

In a three-dimensional image scanner, a grating projection type moire topography is used, so as to capture three-dimensional form information of an object to be measured easily in a short time with a high degree of freedom in measurement. Also, a heat-insulating partition comprising at least two partition walls forming a cooling/heat-insulating path is disposed between a light source and a heat-sensitive section, so as to effectively inhibit the heat generated by the light source from being transmitted to the heat-sensitive section. The three-dimensional form information of the object is captured by a measurement head 12 having a function as a grating projection type moire device. As a consequence, a reference grating such as that in a grating shadow type moire device is unnecessary, and it will be sufficient if a virtual reference grating surface is set at a position conjugate with both of a projection grating 40 and an observation reference grating 46, whereby the size of the measurable object would not be restricted, and the object can be disposed fore and aft through the virtual reference grating surface. A first partition wall 74 is disposed so as to separate a projection lamp 32 and an illumination lamp 64 from a CCD camera 52, and a second partition wall 76 is disposed on the side of the lamps 32, 64, so as to form a cooling passage 102 for guiding the heat generated by both lamps 32, 64 to a cooling fan 70. As a consequence, heat insulation is attained between the lamps 32, 64 and the CCD camera 52, and the temperature rise of the partition wall 74 is suppressed. Further, a cooling fan 72 and a third partition wall 78 are disposed on the side of the CCD camera 52 with respect to the first partition wall 74, so as to form an exhaust heat-insulating path 104. As a consequence, heat is effectively inhibited from being transmitted to the CCD camera 52 via the first partition wall 74.

8 Claims, 5 Drawing Sheets

THREE-DIMENSIONAL IMAGE SCANNER AND HEAT-INSULATING DEVICE FOR OPTICAL APPARATUS

RELATED APPLICATIONS

This application claims the priorities of Japanese Patent Application Nos. 10-32214, 10-32215, and 10-32216, each filed on Jan. 29, 1998, and Japanese Patent Application No. 10-98376 filed on Mar. 26, 1998 which are incorporated herein by reference.

BACKGROUND OF THE INVENTION

1. Field of the Invention

The present invention relates to a three-dimensional image scanner for capturing three-dimensional form information and pattern information of an object to be measured and generating a three-dimensional image of the object; and, in an optical apparatus in which a light source and a heat-sensitive section are accommodated in a common housing, to a heat-insulating device provided with a heat-insulating partition for inhibiting the heat generated by the light source from being transmitted to the heat-sensitive section.

2. Description of the Prior Art

In the fields of computer graphics, plastic surgery, and the like, a three-dimensional image scanner is employed as an input device for three-dimensional images. In general, the three-dimensional image scanner is configured such as to capture three-dimensional form information and pattern information of an object to be measured and generate a three-dimensional image of the object according to thus captured three-dimensional form information and pattern information.

Though a three-dimensional measuring device using a probe, an optical cutting device using an optical sensor, or the like can be chosen as a device for capturing the three-dimensional form information of the object to be measured, the three-dimensional form information can easily be captured in a short time if a moire device is employed.

SUMMARY OF THE INVENTION

When a grating shadow type moire device, which is a typical example of moire device, is used, then the following problems may occur.

Namely, as shown in FIG. 5, a grating shadow type moire device is configured such that light from a point light source P1 irradiates an object to be measured 2 by way of a reference grating 102, and a deformed grating image formed on the object 2 is observed through the reference grating 102 at an observing point P2, so as to yield an image formed with moire fringes. In this grating irradiation type moire device, however, the size of the measurable object 2 is restricted by the size of the reference grating 102, and the object 2 is needed to be placed in front of the reference grating 102, whereby there may occur a problem that the degree of freedom in measurement decreases.

In view of such circumstances, it is a first object of the present invention to provide a three-dimensional image scanner which can capture three-dimensional form information of an object to be measured easily in a short time with a high degree of freedom in measurement.

Further, since the reference grating 102 exists, the above-mentioned grating irradiation type moire device cannot be used, as it is, for capturing the pattern information of the object 2. For capturing this information, it is necessary to take a two-dimensional image of the object 2 with the reference grating 102 being removed so that no moire fringes are formed. Since the reference grating 102 is considerably large, it cannot easily be removed.

In view of such circumstances, it is a second object of the present invention to provide a three-dimensional image scanner which can easily capture pattern information of an object to be measured, while being able to capture three-dimensional form information of the object easily in a short time with a high degree of freedom in measurement.

In an optical apparatus provided with a light source such as lamp, like the moire device mentioned above, the light source acts as a heat source so as to thermally influence its surroundings. In the case where a heat-sensitive section such as a light-receiving element or control circuit which is likely to be influenced by temperature is accommodated in the same housing with the light source, it is necessary to provide a heat-insulating structure for inhibiting the heat generated by the light source to be transmitted to the heat-sensitive section.

Therefore, an exhaust fan has conventionally been disposed at an outer wall portion of the housing, so as to discharge the air heated by the light source to the outside.

Simply providing an exhaust fan, as in the conventional cases, may not yield sufficient heat-insulating effects, however.

For example, in the case where a grating projection type moire device which is configured such as to capture not only the three-dimensional form information but also pattern information of an object to be measured employs a structure for illuminating the object with an illumination lamp, the illumination lamp often has to be disposed relatively close to the imaging section of a CCD camera or the like. In such a case, it is difficult to sufficiently inhibit the heat generated by the illumination lamp from being transmitted to the imaging section by simply providing an exhaust fan. Such a problem can similarly occur in other optical apparatus as well.

In the case employing a configuration in which a first partition for separating the light source and the heat-sensitive section from each other and a second partition disposed on the light source side of the first partition are disposed such as to form a cooling passage for guiding the heat generated by the light source to the exhaust fan, the ventilation efficiency in the cell defined by the first partition can be enhanced. This can suppress the temperature rise in the first partition, thereby inhibiting the heat from being transmitted to the heat-sensitive section through the partition to some extent.

In the case where the heat-sensitive section is extremely sensitive to heat, as in the case of CCD camera or the like, there is a demand for further effectively inhibiting the heat from being transmitted to the heat-sensitive section.

In view of such circumstances, it is a third object of the present invention to provide, in an optical apparatus in which a light source and a heat-sensitive section are accommodated in a common housing, a heat-insulating device which can effectively inhibit the heat generated by the light source from being transmitted to the heat-sensitive section.

The three-dimensional image scanner in accordance with a first aspect of the invention achieves the first object of the present invention by capturing three-dimensional form information by using a grating projection type moire device.

Namely, the three-dimensional image scanner in accordance with the first aspect of the present invention is a three-dimensional image scanner for capturing three-dimensional form information and pattern information of an object to be measured and generating a three-dimensional image of the object according to thus captured three-dimensional form information and pattern information, wherein the three-dimensional form information is captured by a grating projection type moire device.

Preferably, the grating projection type moire device comprises grating moving means for moving at least one of a projection grating provided in a projection optical system of the grating projection type moire device and an observation reference grating provided in an observation optical system of the grating projection type moire device in a direction orthogonal to grating lines of both of the gratings within a plane orthogonal to optical axes of both of the optical systems.

Preferably, the grating projection type moire device further comprises fringe scanning means for determining, according to a plurality of sets of three-dimensional form information captured at individual moving positions of at least one of the projection grating and observation reference grating moved by the grating moving means, an irregular form of each part of the tree-dimensional form information.

Here, "grating projection type moire device" refers to a moire device comprising a projection optical system and an observation optical system, whose optical axes are in parallel to each other, in which an image of a projection grating is projected by the projection optical system onto the object to be measured, and the deformed grating image formed on the object is focused on the observation reference grating by the observation optical system, such that the resulting moire fringes are observed.

The three-dimensional image scanner in accordance with a second aspect of the present invention captures the three-dimensional form information by using a grating projection type moire device, and the pattern information by using an observation optical system of the grating projection type moire device, thereby achieving the second object.

Namely, the three-dimensional image scanner in accordance with the second aspect of the present invention is a three-dimensional image scanner for capturing three-dimensional form information and pattern information of an object to be measured and generating a three-dimensional image of the object according to thus captured three-dimensional form information and pattern information, wherein the three-dimensional form information is captured by a grating projection type moire device, and the pattern information is captured by an observation optical system of the grating projection type moire device.

Preferably, the grating projection type moire device further comprises grating retracting means for retracting at least one of a projection grating provided in a projection optical system of the grating projection type moire device and an observation reference grating provided in the observation optical system to a position deviated from an optical path of the optical system corresponding thereto when capturing the pattern information.

The three-dimensional image scanner in accordance with the third aspect of the present invention captures the three-dimensional form information by using a grating projection type moire device, and the pattern information by using an observation optical system of the grating projection type moire device, and an illumination lamp exclusively used for irradiating the object to be measured is turned on when capturing the pattern information, thereby achieving the second object.

Namely, the three-dimensional image scanner in accordance with the third aspect of the present invention is a three-dimensional image scanner for capturing three-dimensional form information and pattern information of an object to be measured and generating a three-dimensional image of the object according to thus captured three-dimensional form information and pattern information, wherein the three-dimensional form information is captured by a grating projection type moire device, and the pattern information is captured by an observation optical system of the grating projection type moire device; and wherein, when capturing the pattern information, an illumination lamp different from a projection lamp provided in a projection optical system of the projection type moire device is turned on such as to irradiate the object.

Preferably, the projection lamp is turned off when the illumination lamp is turned on.

Preferably, when capturing the pattern information, an observation reference grating provided in the observation optical system is retracted to a position deviated from an optical path of the observation optical system.

The heat-insulating device in accordance with a fourth aspect of the present invention is a heat-insulating device in an optical apparatus in which a light source and a heat-sensitive section are accommodated in a common housing while being separated from each other by a heat-insulating partition such as to inhibit the heat generated by the light source from being transmitted to the heat-sensitive section, wherein the heat-insulating partition comprises at least two partition walls forming a cooling/heat-insulating path.

Here, the "light source" is not restricted to any particular kind of light sources as long as it is a heat radiation type light source which may adversely affect the heat-sensitive section.

The "heat-sensitive section" is not restricted to any particular element as long as it may adversely be affected by the heat generated by the light source, and examples thereof include light-receiving elements, electric circuits, control circuits, precision instruments, and the like.

Preferably, the cooling/heat-insulating path is provided with an intake port for forcibly causing air from outside to flow through the cooling/heat-insulating path, and an exhaust unit.

Preferably, the heat-sensitive section comprises a light-receiving element; and at least one of the partition walls is constituted as a light-shielding wall for inhibiting light from the light source from being made incident on the light-receiving element.

The heat-insulating device may be configured such that the optical apparatus comprises a grating projection type moire device for capturing three-dimensional form information and pattern information of an object to be measured;

the light source comprises an illumination lamp for irradiating the object upon capturing the pattern information; and the light-receiving element comprises an imaging section.

Since the three-dimensional image scanner in accordance with the first aspect of the present invention is configured such that the three-dimensional form information is captured by a grating projection type moire device, it can attain the following effects.

The grating projection type moire device does not necessitate a reference grating such as that in a grating shadow type moire device, whereby it will be sufficient if a virtual reference grating surface is set at a position conjugate with both of the projection grating and observation reference grating. This virtual reference grating surface has a size sufficient for the object to be measured, whereby the size of the object to be measured would not be restricted by the virtual reference grating surface. Also, the object to be measured can be disposed fore and aft through the virtual reference grating surface. As a consequence, the use of the grating projection type moire device increases the degree of freedom in measurement of the object. Also, since it is a moire device, the three-dimensional form information can easily be captured in a short time.

Therefore, the three-dimensional image scanner in accordance with the first aspect of the present invention can capture the three-dimensional form information of the object to be measured easily in a short time with a high degree of freedom in measurement.

In the above-mentioned configuration, in the case where the grating projection type moire device comprises grating moving means for moving at least one of a projection grating provided in a projection optical system of the grating projection type moire device and an observation reference grating provided in an observation optical system of the grating projection type moire device in a direction orthogonal to grating lines of both of the gratings within a plane orthogonal to optical axes of both of the optical systems, irregularities of the object can easily be determined when the directivity of change in moire fringes with respect to the movement of the grating is observed.

In this case, the grating moving means may move the projection grating alone, the observation reference grating alone, or both of them if they are not moved in the same phase.

Since the three-dimensional image scanner in accordance with the second aspect of the present invention is configured such that the three-dimensional form information is captured by a grating projection type moire device, and the pattern information is captured by an observation optical system of the grating projection type moire device, it can attain the following effects.

Namely, not only this three-dimensional image scanner can achieve the effects obtained by the three-dimensional image scanner in accordance with the first aspect of the present invention, but also it is unnecessary to remove a large reference grating in the grating projection type moire device such as that in the grating irradiation type moire device, in regard to the capturing of pattern information, whereby the pattern information can easily be captured by the observation optical system of the grating projection type moire device.

Therefore, the three-dimensional image scanner in accordance with the second aspect of the present invention can capture the three-dimensional form information of the object to be measured easily in a short time with a high degree of freedom in measurement, and can easily capture the pattern information of the object as well.

In this configuration, the pattern information has to be captured in the state where the object to be measured is placed in the state where no moire fringes are formed. Employable as a specific structure therefor is a structure comprising grating retracting means for retracting at least one of a projection grating provided in a projection optical system of the grating projection type moire device and an observation reference grating provided in the observation optical system to a position deviated from an optical path of the optical system corresponding thereto when capturing the pattern information. Since each of the projection grating and observation reference grating is much smaller than the reference grating of the grating irradiation type moire device, they can easily be retracted.

Since the three-dimensional image scanner in accordance with the third aspect of the present invention is configured such that the three-dimensional form information is captured by a grating projection type moire device, the pattern information is captured by an observation optical system of the grating projection type moire device, and an illumination lamp different from a projection lamp provided in a projection optical system of the projection type moire device is turned on when capturing the pattern information such as to irradiate the object, it can attain the following effects.

Namely, not only this three-dimensional image scanner can achieve the effects obtained by the three-dimensional image scanner in accordance with the first aspect of the present invention, but also it is unnecessary to remove a large reference grating in the grating projection type moire device such as that in the grating irradiation type moire device, in regard to the capturing of pattern information, whereby the pattern information can easily be captured by the observation optical system of the grating projection type moire device. Here, since an illumination lamp different from a projection lamp provided in the projection optical system of the projection type moire device is turned on when capturing the pattern information such as to irradiate the object, the shadow of the projection grating formed on the object by the projection lamp can be made substantially unremarkable, whereby the pattern information of the object formed with no moire fringes can be captured even when the projection grating and the observation reference grating are not retracted to a position deviated from the optical paths of the projection optical system and observation optical system.

Therefore, the three-dimensional image scanner in accordance with the third aspect of the present invention can capture the three-dimensional form information of the object to be measured easily in a short time with a high degree of freedom in measurement, and can easily capture the pattern information of the object as well.

In this configuration, though the projection lamp may be kept turned on while the illumination lamp is turned on, if the projection lamp is turned off, then no shadow of the projection grating will be formed, whereby the pattern information can be captured with higher accuracy.

Further, in this configuration, if the observation reference grating is retracted to a position deviated from the optical path of the observation system path when capturing the pattern information, then a sufficient quantity of light incident on the imaging device of the observation optical system can be secured. Also, in the case where the imaging device is a CCD camera or the like, artificial moire fringes can be prevented from occurring between the observation reference grating and the CCD or the like, whereby the pattern information can be captured with much higher accuracy.

Since the heat-insulating device in accordance with the fourth aspect of the present invention is configured such that, between a light source and a heat-sensitive section, a heat-insulating partition comprising at least two partition walls forming a cooling/heat-insulating path in order to inhibit the heat generated by the light source from being transmitted to the heat-sensitive section is provided, it can effectively inhibit the heat generated by the light source from being transmitted to the heat-sensitive section.

In this configuration, if the cooling/heat-insulating path is formed with an intake port for forcibly causing the outside air to flow through the cooling/heat-insulating path, and an exhaust unit, then the air flow from the intake port to the exhaust unit can be made very smooth, whereby the heat exhaust efficiency can be enhanced.

Also, in this configuration, when the heat-sensitive section comprises a light-receiving element, if at least one of the partition walls forming the cooling/heat-insulating path is formed as a light-shielding wall for inhibiting light from the light source from being made incident on the light-receiving element, then the heat-insulating device can also have a light-shielding function.

Further, in the case where the optical apparatus comprises a grating projection type moire device for capturing three-dimensional form information and pattern information of an object to be measured; the light source comprises an illumination lamp for irradiating the object upon capturing the pattern information; and the light-receiving element comprises an imaging section; the illumination lamp and the imaging section are often disposed relatively close to each other. Since the illumination lamp has a large heating value, whereas the imaging section is likely to be influenced by heat, employing the configuration in accordance with the fourth aspect of the present invention is effective in particular.

DESCRIPTION OF THE PREFERRED EMBODIMENTS

In the following, embodiments of the present invention will be explained with reference to the accompanying drawings.

Figure 1:
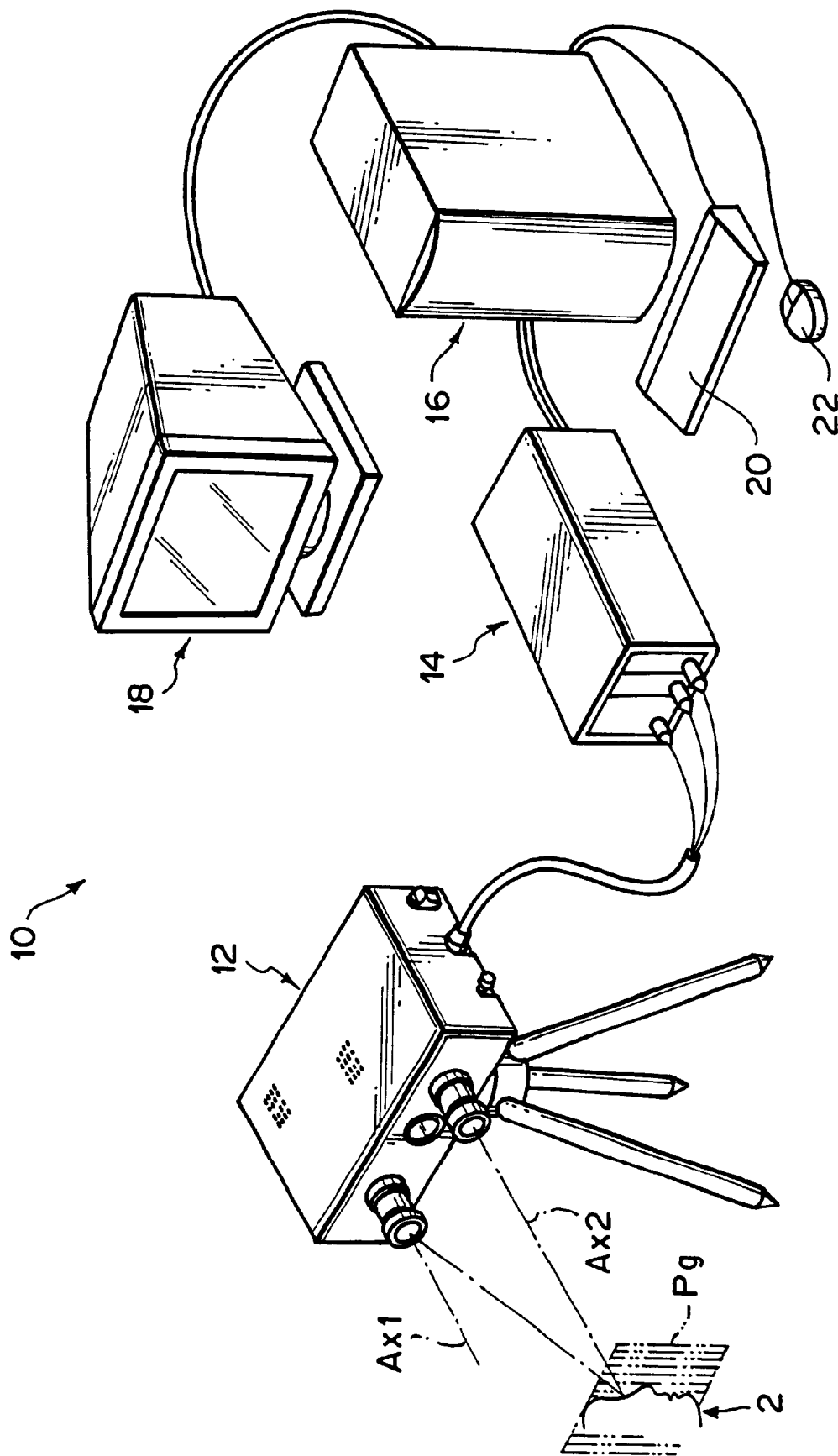
FIG. 1 is a perspective view showing an overall configuration of the three-dimensional image scanner in accordance with an embodiment of the present invention.

FIG. 1 is a perspective view showing an overall configuration of the three-dimensional image scanner in accordance with an embodiment of the present invention. This three-dimensional image scanner incorporates therein, as a measurement head, an optical apparatus provide with a heat-insulating device in accordance with an embodiment of the present invention.

As depicted, this three-dimensional image scanner 10 comprises a measurement head 12, a power instrument drive unit 14, a control unit 16, and a display unit 18. The measurement head 12 captures three-dimensional form information and pattern (texture) information of an object to be measured 2. Thus captured three-dimensional form information and pattern information are outputted to the control unit 16 by way of the power instrument drive unit 14, and are combined together in the control unit 16, so as to produce a three-dimensional image of the object 2 and display it on the display unit 18. A keyboard 20 and a mouse 22 are connected to the control unit 16. As the keyboard 20 and the mouse 22 are operated, the contents of display in the display unit 18 such as the display angle of three-dimensional image can be switched.

The measurement head 12 captures the three-dimensional form information by utilizing a grating projection type moire topography. Namely, the measurement head 12 also functions as a grating projection type moire device. In FIG. 1, the grating surface Pg indicated by chain double-dashed lines in front of the measurement head 12 is a virtual reference grating surface in the grating projection type moire topography.

Figure 2:
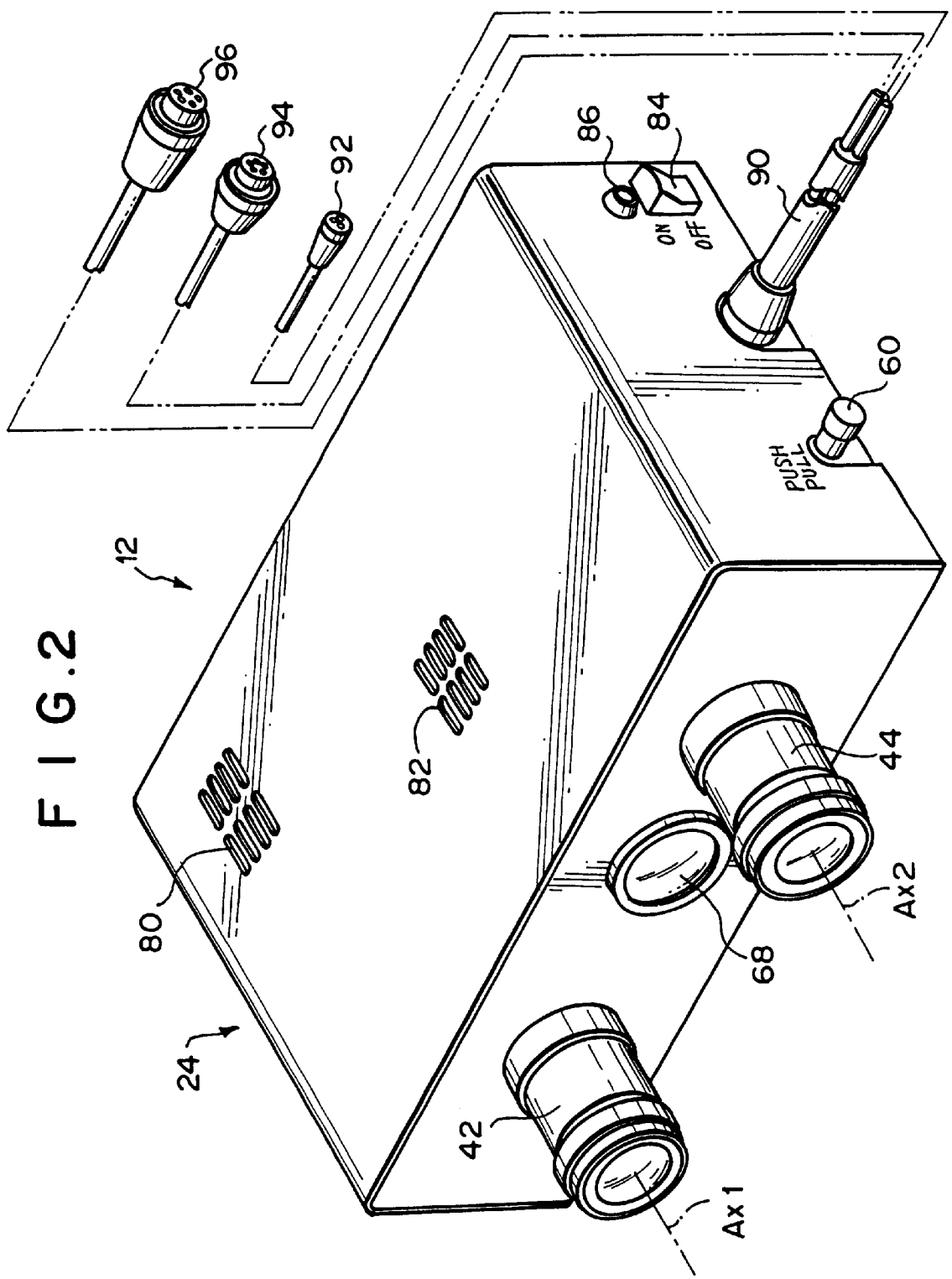
FIG. 2 is a perspective view showing an appearance of the measurement head in the three-dimensional image scanner shown in FIG. 1.
Figure 3:
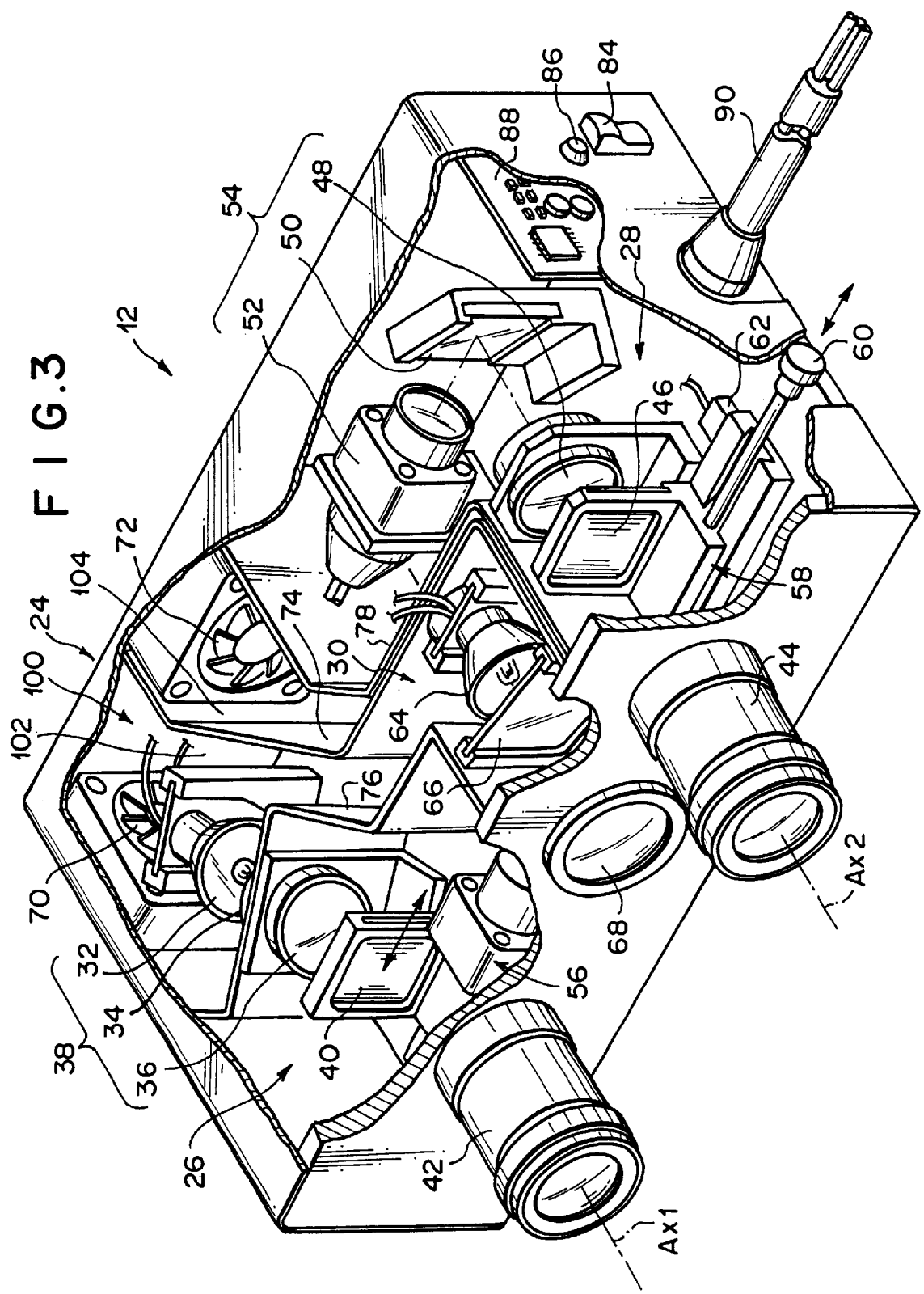
FIG. 3 is a perspective view showing an inner configuration of the measurement head in the three-dimensional image scanner shown in FIG. 1.

FIG. 2 is a perspective view showing an appearance of the measurement head 12, whereas FIG. 3 is a perspective view showing an inner configuration of the measurement head 12.

As shown in these drawings, the measurement head 12 comprises a casing 24 (housing), and a projection optical system 26, an observation optical system 28, an object illumination system 30, and a heat-insulating device 100 which are disposed within the casing 24.

The projection optical system 26 comprises a grating illumination system 38 composed of a projection lamp 32 (light source), a heat-wave cutoff filter 34, and a condenser lens 36; a projection grating 40; and a projection lens 42. The observation optical system 28 comprises a taking lens 44; an observation reference grating 46; and a television optical system 54 comprising a field lens 48, a bending mirror 50, and a CCD camera 52 (imaging section, light-receiving element, and heat-sensitive section).

The projection lens 42 and the taking lens 44 are attached to the front face of the casing 24 such that their respective optical axes Ax1 and Ax2 are in parallel to each other.

The grating illumination system 38 is disposed such as to irradiate the projection grating 40 obliquely from the left side therebehind with respect to the optical axis Ax1. The image of the projection lamp 32 is substantially focused upon the entrance pupil position of the projection lens 42. The condenser lens 36 has a size sufficient for covering the projection grating 40.

The observation reference grating 46 and the field lens 48 of the television optical system 54 are disposed on the optical axis Ax2, whereas the CCD camera 52 is disposed on the optical axis bent perpendicularly to the optical axis Ax2 by the bending mirror 50. The field lens 48 is disposed such that the luminous flux transmitted through the observation reference grating 46 is made incident on the CCD camera 52.

Each of the projection grating 40 and the observation reference grating 46 has vertically-extending grating lines disposed at intervals of an identical pitch. These gratings 40 and 46 are disposed within the same plane orthogonal to the optical axes Ax1 and Ax2. The projection grating 40 is disposed in such a positional relationship that is conjugate with the virtual reference grating surface Pg (see FIG. 1) so that the image of the projection grating 40 is focused on the virtual reference grating surface Pg. Also, the observation reference grating 46 is disposed in such a positional relationship that is conjugate with the virtual reference grating surface Pg so that the image of the observation reference grating 46 is focused on the virtual reference grating surface Pg.

Figure 4:
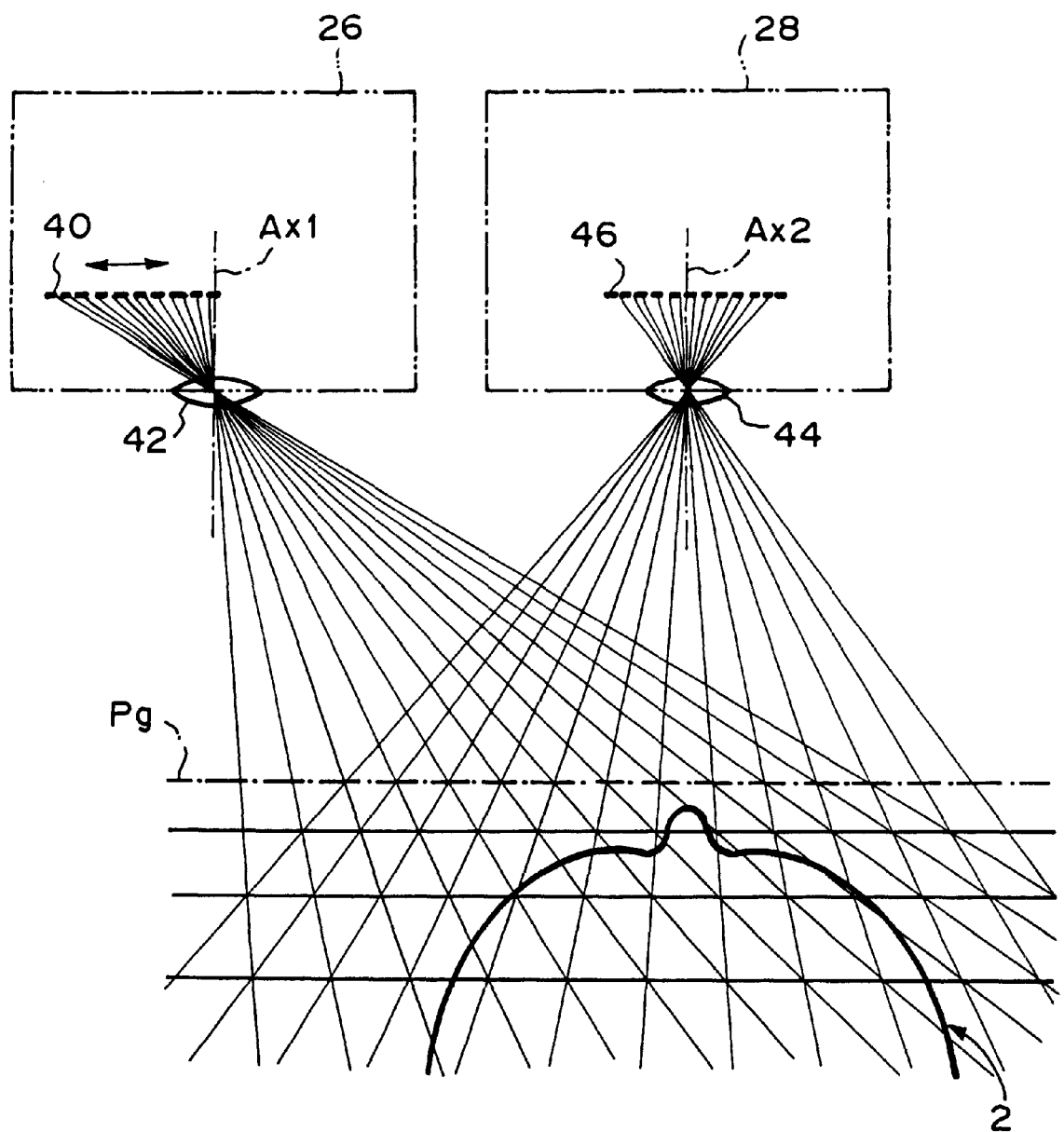
FIG. 4 is a plan view for explaining functions of the measurement head in the three-dimensional image scanner shown in FIG. 1 as a grating projection type moire device.
Figure 5:
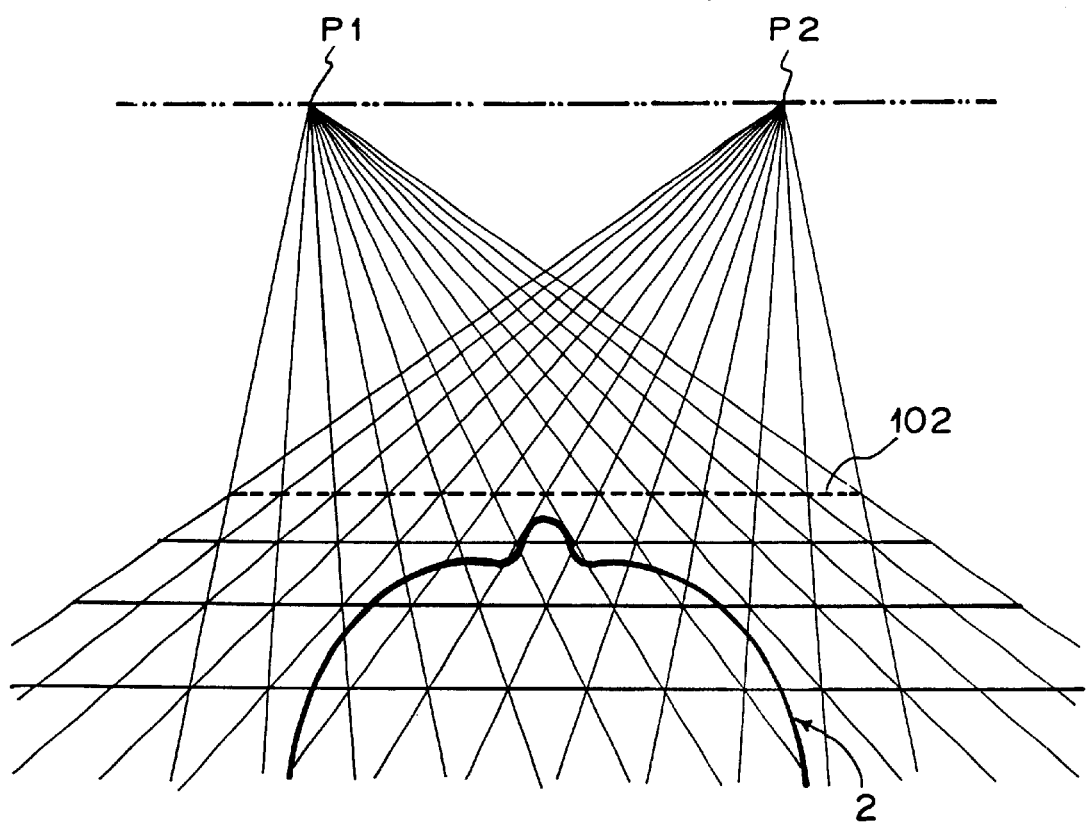
FIG. 5 is a schematic view showing a conventional example.

FIG. 4 is a plan view for explaining the function of the measurement head 12 as the grating projection type moire device.

As depicted, the measurement head 12 is configured such that the image of the projection grating 40 is projected onto the object 2, while the deformed grating image formed on the object 2 is focused onto the observation reference grating 46 by the observation optical system 28, and the resulting moire fringes are observed.

In FIG. 4, the virtual reference grating surface Pg indicated by the chain line and a plurality of surfaces indicated by solid lines in parallel to the virtual reference grating surface Pg form moire surfaces, and moire fringes are formed along the curve on which the individual moire surfaces intersect the object 2. Though the moire surfaces are indicated by solid lines only in front of the virtual reference grating surface Pg in FIG. 4, a plurality of moire surfaces are also formed behind the virtual reference grating surface Pg. Therefore, moire fringes are also formed in the case where the object 2 is disposed fore and aft through the virtual reference grating surface Pg.

As shown in FIG. 3, the projection grating 40 is supported by a grating conveying mechanism 56, such as to be reciprocated by the latter in horizontal directions (i.e., directions orthogonal to the grating lines of the projection grating 40) within a plane orthogonal to the optical axis Ax1. The grating conveying mechanism 56 is constituted by a pulse stage, such as to vibrate the projection grating 40 in a reciprocating fashion over a length of one phase (thereby effecting a fringe scan). The reciprocating vibration may also be effected by a piezoelectric element or the like instead of the pulse stage.

As the projection grating 40 moves, the phase between the projection grating 40 and the observation reference grating 46 changes, whereby the moire fringes vary accordingly. Therefore, the control unit 16 (see FIG. 1) samples the moire fringe image every ¼ phase, thereby determining the irregularities of the object.

The observation reference grating 46 is supported by the grating retracting mechanism 58, and is moved by the latter in horizontal directions within a plane orthogonal to the optical axis Ax2, so as to be able to selectively take a moire fringe observation position located in the optical path of the observation optical system 28 and a retraction position deviated from this optical path. As a grating retracting knob 60 in the grating retracting mechanism 58 which projects from the right side face of the casing 24 is manually pushed and pulled, the observation reference grating 46 is moved. The grating retracting mechanism 58 is provided with a limit switch 62 which detects the observation reference grating 46 when the latter reaches the retraction position.

The moire fringe observation for capturing the three-dimensional form information of the object 2 is effected in a state where the observation reference grating 46 is set at the moire fringe observation position. Here, if the observation reference grating 46 is retracted to the retraction position, then a two-dimensional image of the object 2 formed with no moire fringes can be taken. Therefore, in the measurement head 12, the pattern information of the object 2 is captured upon taking this two-dimensional image.

Here, instead of retracting the observation reference grating 46 to the retraction position, the projection grating 40 may be retracted to a position deviated from the optical path of the projection optical system 26, such that the two-dimensional image of the object 2 formed with no moire fringes can be taken. This configuration, however, is not so preferable in that, since the observation reference grating 46 remains at the moire fringe observation position, artifact moire fringes may occur between the observation reference grating 46 and the CCD camera 52, and that the quantity of light incident on the CCD camera 52 is reduced by half.

As shown in FIG. 3, the object illumination system 30 is disposed between the projection optical system 26 and the observation optical system 28. The object illumination system 30 comprises an illumination lamp 64 (light source), a heat-wave cutoff filter 66, and a diffuser window 68 attached to the front face of the casing 24, and divergently emits the light from the illumination lamp 64 through the heat-wave cutoff filter 66 and the diffuser window 68.

The illumination lamp 64 is turned off when observing the moire fringes but is turned on when taking the two-dimensional image. In synchronization with the turning-on operation, the projection lamp 32 of the grating illumination system 38 is turned off. This switching operation is effected according to the detection signal of the limit switch 62.

If the taking of a two-dimensional image is effected in the state where the projection lamp 32 is kept turned on without turning on the illumination lamp 64, the two-dimensional image will be taken in the state where the image of the projection grating 40 is formed. In order to avoid such a situation, the lighting is switched from the projection lamp 32 to the illumination lamp 64. When the illumination lamp 64 is turned on, even if the projection lamp 32 is kept turned on, then the influence of the projection grating 40 would become very small. Therefore, it is not always necessary to turn off the projection lamp 32 in synchronization with the turning-on operation of the illumination lamp 64.

The heat-insulating device 100 will now be explained.

The heat-insulating device 100 is a device for inhibiting the heat generated by the projection lamp 32 and illumination lamp 64 from being transmitted to the CCD camera 52, and comprises two cooling fans 70, 72 (exhaust fans) for discharging the air (heat) within the casing 24 to the outside, and first, second, and third partition walls 74, 76, and 78 each made of a metal plate.

The cooling fan 70 is attached to the left sidewall of the casing 24, whereas the cooling fan 72 is attached to the rear wall of the casing 24.

The first partition wall 74 is disposed such as to completely separate the projection lamp 32 and illumination lamp 64 from the CCD camera 52. Here, the partitioning position of the first partition wall 74 is set such that the cooling fan 70 is located on one side of the partition together with the lamps 32 and 64, whereas the cooling fan 72 is located on the other side together with the CCD camera 52. The second partition wall 76 is disposed on the opposite side of the first partition wall 74 with respect to the lamps 32 and 64. The first partition wall 74 and the second partition wall 76 form a cooling passage therebetween, such as to guide therethrough the heat generated by the lamps 32 and 64 to the cooling fan 70.

The third partition wall 78 is disposed between the CCD camera 52 and the first partition wall 74 such as to be positioned nearer the CCD camera 52 than the cooling fan 72. The third partition wall 78 and the first partition wall 74 form an exhaust heat-insulating path 104, such as to guide the air (heat) within the heat-insulating path 104 to the cooling fan 72.

As shown in FIG. 2, intake ports 80 and 82 are formed in the upper wall of the casing 24 above the lamps 32 and 64, respectively. As the air is taken in through these intake ports 80, 82, the air (heat) can smoothly flow through the cooling passage 102 and exhaust heat-insulating path 104, thereby improving the heat exhaust efficiency attained by the cooling fans 70, 72. The intake port 82 is positioned such as to extend over both of the cooling passage 102 and the exhaust heat-insulating path 104.

The right side face of the casing 24 is provided with a power switch 84 and a power lamp 86 in addition to the grating retracting knob 60. An electronic circuit board 88 is disposed inside this side face. Extending from the right side face of the casing 24 is a power and signal cord 90, the other end of which is connected to the power instrument drive unit 14 (see FIG. 1) via a power connector 92, a control signal connector 94, and a television signal connector 96.

As explained in detail in the foregoing, since the three-dimensional image scanner 10 in accordance with this embodiment is configured such that the capture of the three-dimensional form information is effected by the measurement head 12 having a function as a grating projection type moire device, a reference grating such as that in a grating shadow type moire device is unnecessary, and it will be sufficient if the virtual reference grating surface Pg is set at a position conjugate with both of the projection grating 40 and observation reference grating 46. Since this virtual reference grating surface Pg has an infinite area, the size of the object 2 that can be measured would not be restricted by the virtual reference grating surface Pg, and the object 2 can be disposed fore and aft through the virtual reference grating surface Pg, whereby the degree of freedom in measurement of the object 2 can be enhanced. Since it is a moire device, the three-dimensional form information can easily be captured in a short time.

Therefore, in accordance with this embodiment, the three-dimensional form information of the object to be measured can easily be captured in a short time with a high degree of freedom in measurement.

Also, since this embodiment comprises the grating conveying mechanism 56 for moving the projection grating 40 along directions orthogonal to the grating lines of the projection grating 40 within a plane orthogonal to the optical axis Ax1 of the projection optical system 26, irregularities of the object 2 can easily be determined by observing the directivity of change in moire fringes with respect to the movement of the grating.

Further, since the capture of the pattern information of the object 2 is effected in the three-dimensional image scanner 10 in accordance with this embodiment such that the two-dimensional image of the object 2 is taken in the state where the observation reference grating 46 is retracted by the grating retracting mechanism 58 to a position deviated from the optical path of the observation optical, the required pattern information can easily be captured without necessitating any troublesome operation for removing a large reference grating such as that in the case of a grating shadow type moire device.

Also, since the three-dimensional image scanner 10 in accordance with this embodiment is configured such that, when capturing the pattern information of the object 2, in synchronization with the retracting movement of the observation reference grating 46 to the position deviated from the optical path of the observation optical system 28, the illumination lamp 64 is turned on so as to illuminate the object 2, and the projection lamp 32 is turned off, the two-dimensional image of the object 2 can be taken while the latter is in the state where no moire fringes are formed. As a consequence, the required pattern information can easily be captured with very high accuracy without necessitating any troublesome operation for removing a large reference grating such as that in the case of a grating shadow type moire device.

Further, though the illumination lamp 64 and the CCD camera 52 are disposed relatively close to each other within the casing 24 of the measurement head 12 together with the projection lamp 32 in this embodiment, since the heat-insulating device 100 is provided within the casing 24, the heat generated by the lamps 32 and 64 can effectively be inhibited from being transmitted to the heat-sensitive section.

Namely, since the first partition wall 74 is disposed such as to separate the projection lamp 32 and illumination lamp 64 from the CCD camera 52, it can attain heat insulation between the lamps 32, 64 and the CCD camera 52.

Also, since the second partition wall 76 disposed opposite the first partition wall 74 with respect to the lamps 32, 64 and the first partition wall 74 form the cooling passage 102 for guiding the heat generated by the lamps 32, 64 to the cooling fan 70, the cell on the side of the lamps 32, 64 partitioned by the first partition wall 74 can efficiently be ventilated and cooled, whereby the temperature rise of the first partition wall 74 can be suppressed.

Further, since the third partition wall 78 is disposed between the CCD camera 52 and the first partition wall 74, so as to form the exhaust heat-insulating path 104 between the third partition wall 78 and the first partition wall 74, such that the air (heat) within the exhaust heat-insulating path 104 is guided to the cooling fan 72, the heat generated by the lamps 32, 64 can effectively be inhibited from being transmitted toward the CCD camera 52 through the first partition wall 74.

Therefore, the CCD camera 52 can fully be protected.

Also, in this embodiment, as the air is taken in through the intake ports formed in the upper wall of the casing 24 above the lamps 32, 64, the air (heat) can smoothly flow through the cooling passage 102 and exhaust heat-insulating path 104, whereby the exhaust heat efficiency attained by the cooling fans 70, 72 can be enhanced.

Further, since each of the first and third partition walls 74 and 78 is made of a metal, the light from the lamps 32, 64 can securely be inhibited from being made incident on the image-receiving face of the CCD camera 52.

Though the CCD camera 52 is commonly used for capturing the three-dimensional form information of the object 2 and the pattern information thereof in the above-mentioned embodiment, the CCD camera 52 may be used exclusively for capturing the three-dimensional form information, and a separate camera for exclusively capturing the pattern information may be incorporated in the measurement head 12. In this case, the imaging position of the pattern information capturing camera can be left focused on the object 2. As a consequence, even when the observation reference grating 46 is left set at the moire fringe observation position, the pattern information can be captured without artificial moire fringes being generated by the observation reference grating 46.

The heat-insulating device in the optical apparatus of the present invention should not be restricted to that of the above-mentioned embodiment. For example, a configuration lacking the cooling fan 72, a configuration in which the exhaust heat-insulating path 104 lacks the intake port 82, and the like are possible, of course.

What is claimed is:

1. A three-dimensional image scanner for capturing three-dimensional form information and pattern information (two-dimensional image) of an object to be measured and generating a three-dimensional image of said object according to thus captured three-dimensional form information and pattern information (two-dimensional image), wherein said three-dimensional form information is captured by a grating projection type moire device.

2. A three-dimensional image scanner according to claim 1, wherein said grating projection type moire device comprises grating moving means for moving at least one of a projection grating provided in a projection optical system of said grating projection type moire device and an observation reference grating provided in an observation optical system of said grating projection type moire device in a direction orthogonal to grating lines of both of said gratings within a plane orthogonal to optical axes of both of said optical systems.

3. A three-dimensional image scanner according to claim 2, wherein said grating projection type moire device further comprises fringe scanning means for determining, according to a plurality of sets of three-dimensional form information captured at individual moving positions of at least one of said projection grating and observation reference grating moved by said grating moving means, an irregular form of each part of said three-dimensional form information.

4. A three-dimensional image scanner for capturing three-dimensional form information and pattern information (two-dimensional image) of an object to be measured and generating a three-dimensional image of said object according to thus captured three-dimensional form information and pattern information (two-dimensional image), wherein said three-dimensional form information is captured by a grating projection type moire device, and said pattern information (two-dimensional image) is captured by an observation optical system of said grating projection type moire device.

5. A three-dimensional image scanner according to claim 4, further comprising grating retracting means for retracting at least one of a projection grating provided in a projection optical system of said grating projection type moire device and an observation reference grating provided in said observation optical system to a position deviated from an optical path of the optical system corresponding thereto when capturing said pattern information (two-dimensional image).

6. A three-dimensional image scanner for capturing three-dimensional form information and pattern information (two-dimensional image) of an object to be measured and generating a three-dimensional image of said object according to thus captured three-dimensional form information and pattern information (two-dimensional image), wherein said three-dimensional form information is captured by a grating projection type moire device, and said pattern information (two-dimensional image) is captured by an observation optical system of said grating projection type moire device; and wherein, when capturing said pattern information (two-dimensional image), an illumination lamp different from a projection lamp provided in a projection optical system of said projection type moire device is turned on such as to irradiate said object.

7. A three-dimensional image scanner according to claim 6, wherein said projection lamp is turned off when said illumination lamp is turned on.

8. A three-dimensional image scanner according to claim 6, wherein, when capturing said pattern information (two-dimensional image), an observation reference grating provided in said observation optical system is retracted to a position deviated from an optical path of said observation optical system.

* * * * *